United States Patent
Kono et al.

(10) Patent No.: US 9,733,368 B2
(45) Date of Patent: Aug. 15, 2017

(54) NEUTRON MEASUREMENT APPARATUS AND NEUTRON MEASUREMENT METHOD

(71) Applicant: Kabushiki Kaisha Toshiba, Minato-ku (JP)

(72) Inventors: Shigehiro Kono, Tama (JP); Daijiro Ito, Kodaira (JP); Makoto Tomitaka, Saitama (JP); Tsuyoshi Kumagai, Fuchu (JP); Norihiro Umemura, Fuchu (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 21 days.

(21) Appl. No.: 14/926,179

(22) Filed: Oct. 29, 2015

(65) Prior Publication Data
US 2016/0131775 A1 May 12, 2016

(30) Foreign Application Priority Data
Nov. 11, 2014 (JP) ................................. 2014-229293

(51) Int. Cl.
*G01T 3/00* (2006.01)
*G01T 7/00* (2006.01)

(52) U.S. Cl.
CPC ................ *G01T 3/00* (2013.01); *G01T 7/005* (2013.01)

(58) Field of Classification Search
CPC .................................. G01T 3/00; G01T 7/005
See application file for complete search history.

(56) References Cited

U.S. PATENT DOCUMENTS

| 4,493,811 A | 1/1985 | Seki et al. |
| 8,878,139 B2 | 11/2014 | Kono et al. |
| 2009/0003506 A1* | 1/2009 | Kitazono ............. G21C 17/108 376/259 |

FOREIGN PATENT DOCUMENTS

| CN | 103995279 A | 8/2014 |
| JP | 2002-22879 A | 1/2002 |

(Continued)

OTHER PUBLICATIONS

M. Izumi et al. "Digital Signal Processing of Pulse Counting and MSV Measurement for In-Core Instrumentation", INIS-FR-601, 2001, 9 pages.

(Continued)

*Primary Examiner* — Mark R Gaworecki
(74) *Attorney, Agent, or Firm* — Oblon, McClelland, Maier & Neustadt, L.L.P.

(57) ABSTRACT

According to an embodiment, a neutron measurement apparatus has: a neutron detector; a preamplifier that amplifies an output signal of the neutron detector and outputs a neutron detection signal; a pulse counting unit that measures the neutron intensity by using pulse counting method by which the neutron detection signal is used to count the number of individual pulses; a Campbell measurement unit that measures the neutron intensity by using Campbell method by which a time average of squares of AC component of the neutron detection signal is calculated; a correction constant calculation unit that calculates a correction constant for correcting an output of the Campbell measurement unit by using an output of the pulse counting unit and an output of the Campbell measurement unit; and a correction value calculation unit that outputs, based on the output of the Campbell measurement unit, a corrected value by using the correction constant.

4 Claims, 16 Drawing Sheets

(56) References Cited

FOREIGN PATENT DOCUMENTS

| | | | |
|---|---|---|---|
| JP | 2002022879 A | * | 1/2002 |
| JP | 2003-149378 A | | 5/2003 |
| JP | 2010-281703 A | | 12/2010 |
| JP | 5665783 | | 2/2015 |

OTHER PUBLICATIONS

Preliminary Search Report issued Jul. 5, 2016 in French Patent Application No. 1560623 (with English translation of category of cited documents).

* cited by examiner ent. Therefore, the first step of the invention is to describe the present invention.

NEUTRON MEASUREMENT APPARATUS AND NEUTRON MEASUREMENT METHOD

CROSS-REFERENCE TO RELATED APPLICATIONS

This application is based upon and claims the benefit of priority from Japanese Patent Application No. 2014-229293 filed on Nov. 11, 2014, the entire content of which is incorporated herein by reference.

FIELD

The present invention relates to a neutron measurement apparatus and a neutron measurement method.

BACKGROUND

In general, in the case of a boiling-water reactor, for a neutron measurement apparatus that measures neutrons inside the reactor during startup or shutdown, pulse counting method and Campbell method are used in combination.

As such a neutron measurement apparatus, there has been a start-up range monitor (also referred to as a wide range monitor). Refer to U.S. Pat. No. 4,493,811, for example, the entire content of which is incorporated herein by reference.

In the above-described start-up range monitor, two different measurement methods, or the pulse counting method and Campbell method, are used in combination. Therefore, it is required to smoothly connect measurement results in such a way as to avoid a shift in the linearity of the input and output at a point where the two measurement methods are switched.

FIG. 15 is a schematic graph that is obtained by using the pulse counting method and Campbell method to measure an output signal of a neutron detector, showing relation of measured values with respect to neutron intensity when there is a Transition region. In FIG. 15, a range where a portion of curve A, which represents the results of measurement by pulse counting method, that keeps the input-and-output linearity with respect to neutron intensity overlaps with a portion of curve B, which represents the results of measurement by Campbell method, that keeps the input-and-output linearity with respect to neutron intensity is referred to as a Transition region of the pulse counting method and Campbell measurement method.

The neutron detector generates one pulse-like signal (pulse signal) for one neutron entering the detector. However, if a larger number of neutrons start entering the neutron detector as a result of an increase in the neutron intensity, the neutron detector would face difficulty counting each of individual pulse signals. As a result, a so-called pulse-counting saturated state would emerge. In this manner, the curve A loses linearity when the neutron intensity is increased.

Meanwhile, according to the measurement by Campbell method, the measurement is carried out by calculating the mean square of AC signal component of a neutron detector output signal that is made up of overlapping pulse signals. However, in a range where the neutron intensity is low, an AC component of background is stronger than the AC signal component of the neutron detector signal. Accordingly, the curve B loses linearity in the range where the neutron intensity is low.

Upper-limit neutron intensity $\Phi_1$, to which from lower region the linearity is maintained in the case of the pulse counting method, needs to be sufficiently higher than lower-limit neutron intensity $\Phi_2$, to which from upper region the linearity is maintained in the case of the Campbell method. If not, a sufficiently-wide Transition region cannot be formed. As a result, when the measurement method is switched from the pulse counting method to the Campbell method, it is difficult to smoothly connect the measured values.

FIG. 16 is a schematic graph that is obtained by using the pulse counting method and Campbell method to measure an output signal of a neutron detector, showing relation of measured values with respect to neutron intensity when there is a discontinuous region. As shown in FIG. 16, if upper-limit neutron intensity $\Phi_1$, to which from lower region the linearity is maintained in the case of the pulse counting method, is lower than lower-limit neutron intensity $\Phi_2$, to which from upper region the linearity is maintained in the case of the Campbell method, there will be a discontinuous region between the Pulse and Campbell regions where the linearity can be achieved by neither the pulse counting method nor Campbell method. As a result, a difference in level emerges when the measurement results of the two are connected. In this manner, it is difficult to smoothly connect the curves A and B.

The object of embodiments of the present invention is to enable the measurement by Campbell method of relatively low-intensity neutrons, which have been measured by pulse counting method in the conventional case.

According to an aspect of the embodiment, there is provided a neutron measurement apparatus to measure neutron intensity in a region where a nuclear reactor power is lower than the Power Range which is close to a rated reactor power, the apparatus comprising: a neutron detector to generate an output signal corresponding to an incoming neutron; a preamplifier to amplify an output signal of the neutron detector to output a preamplifier to amplify an output signal of the neutron detector to output the amplified output signal of the neutron detector as a neutron detection signal; a pulse counting unit to measure the neutron intensity by using pulse counting method by which the neutron detection signal is used to count the number of individual pulses; a Campbell measurement unit to measure the neutron intensity by using Campbell method by which a time average of squares of AC component of the neutron detection signals is calculated; a correction constant calculation unit to calculate a correction constant for correcting an output of the Campbell measurement unit by using an output of the pulse counting unit and an output of the Campbell measurement unit; and a correction value calculation unit that outputs, based on the output of the Campbell measurement unit, a corrected value by using the correction constant.

According to another aspect of the embodiment, there is provided a neutron measurement for measuring neutron intensity in a region where a nuclear reactor power is lower than the Power Range which is close to a rated reactor power, the method comprising: a pulse counting measurement step of measuring the neutron intensity by using pulse counting method; a correction constant calculation step of calculating a correction constant based on relation between an output of a pulse counting unit and an output of a Campbell measurement unit, in a region where linearity of input and output is maintained in the pulse counting method; and a correction value calculation step by a correction value calculation unit of receiving, as an input, an output value of the Campbell measurement unit after the correction constant calculation step, and calculating a corrected output value of the Campbell measurement unit by using a correction formula that uses the correction constant.

BRIEF DESCRIPTION OF THE DRAWINGS

The above and other features and advantages of the present invention will become apparent from the discussion hereinbelow of specific, illustrative embodiments thereof presented in conjunction with the accompanying drawings, wherein.

DETAILED DESCRIPTION

Now, preferred embodiments of a neutron measurement apparatus and a neutron measurement method will be described below by referring to the accompanying drawings. Throughout the drawings, same or similar sections are denoted by the same reference symbols and will not be described repeatedly.

[First Embodiment]

Figure 1:
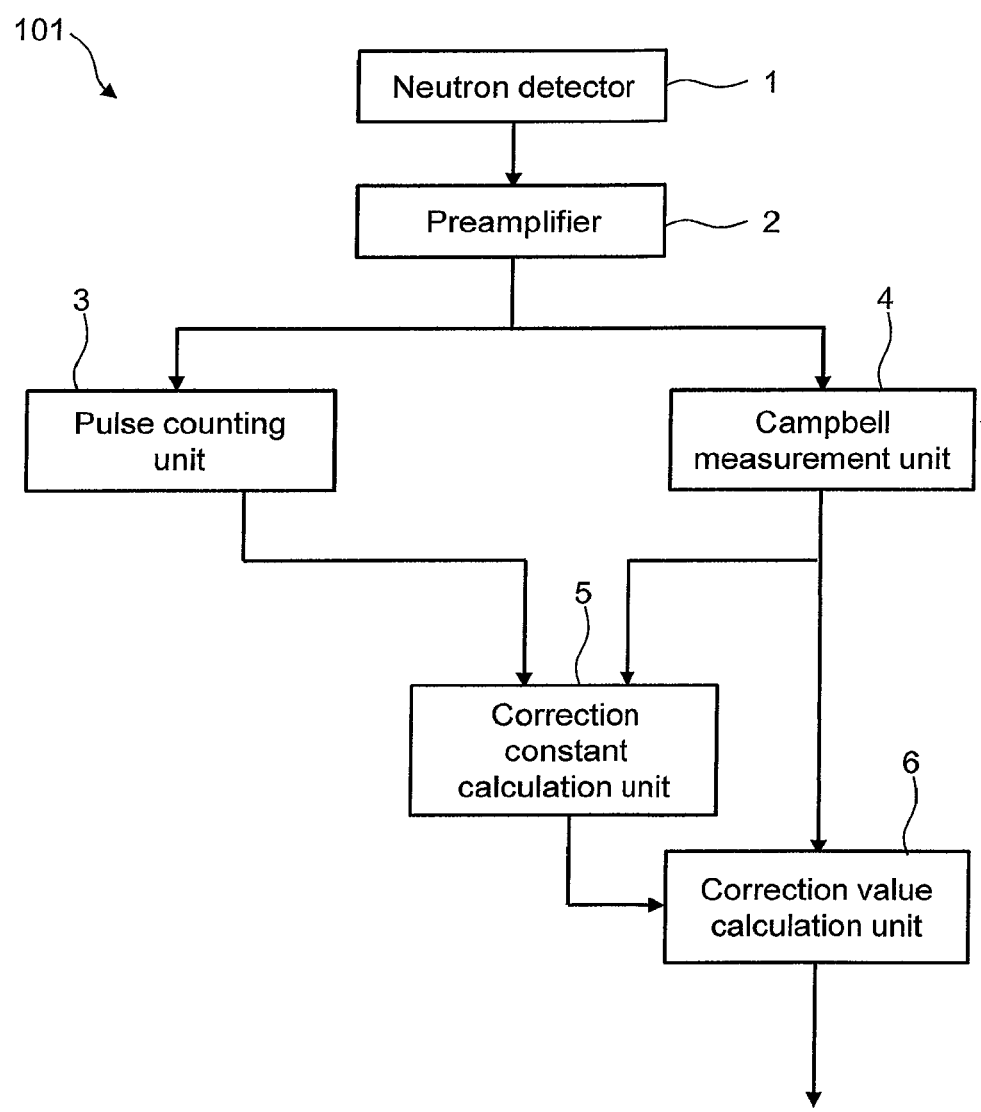
FIG. 1 is a block diagram showing the overall configuration of a neutron measurement apparatus according to a first embodiment.

FIG. 1 is a block diagram showing the overall configuration of a neutron measurement apparatus according to a first embodiment. A neutron measurement apparatus 101 of the present embodiment is designed to measure the neutron intensity of a reactor core in a region that is lower than the Power Range where a reactor power is close to the rated power. The neutron measurement apparatus 101 includes a neutron detector 1, a preamplifier 2, a pulse counting unit 3, a Campbell measurement unit 4, a correction constant calculation unit 5, and a correction value calculation unit 6.

The neutron detector 1 generates an output signal corresponding to a neutron that has entered when the neutron detector 1 is situated inside the reactor core. The preamplifier 2 amplifies an output signal of the neutron detector 1 and outputs the amplified output signal of the neutron detector (hereinafter referred to as a neutron detection signal). The neutron detection signal from the preamplifier 2 is input into the pulse counting unit 3 and the Campbell measurement unit 4.

The pulse counting unit 3 uses the neutron detection signal supplied from the preamplifier 2, and measures the neutron intensity by using the pulse counting method, by which the number of individual pulses is counted. The Campbell measurement unit 4 measures the neutron intensity by using the Campbell method, by which the time average of the squares of AC component of the neutron detection signal coming from the preamplifier 2 is calculated.

The correction constant calculation unit 5 calculates correction constants for correcting the output of the Campbell measurement unit 4 by using the output of the pulse counting unit 3 and the output of the Campbell measurement unit 4, by using the method described later. The correction value calculation unit 6 corrects the output of the Campbell measurement unit 4 by using the correction constants calculated by the correction constant calculation unit 5, and outputs the corrected value of the output of the Campbell measurement unit 4.

Figure 2:
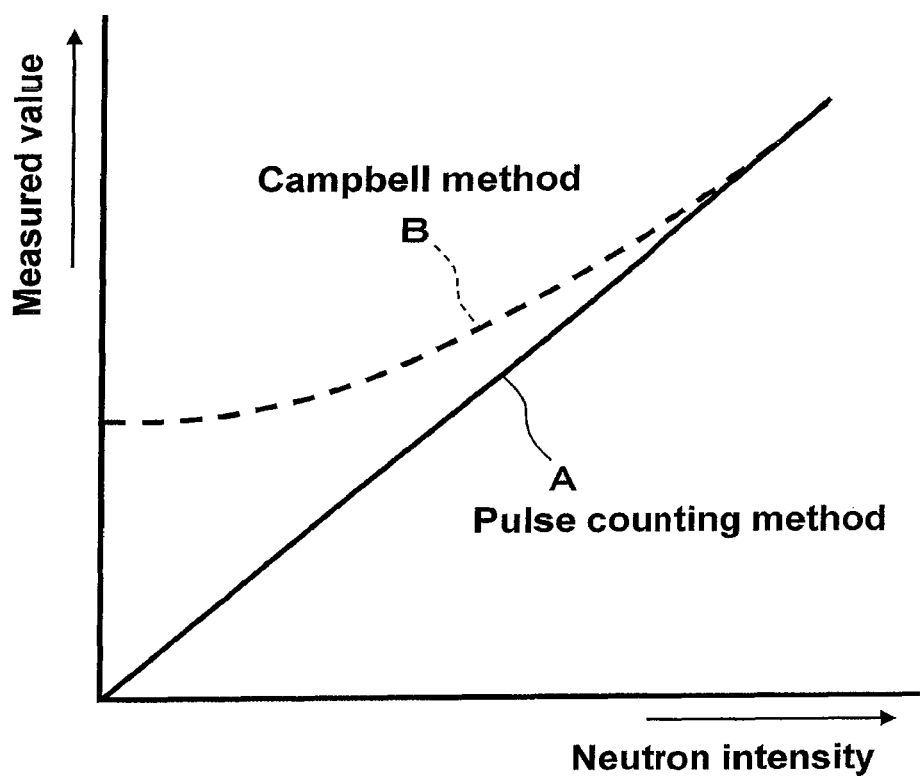
FIG. 2 is a schematic graph showing relation of measured values with respect to neutron intensity when being shown on a logarithmic scale both on the horizontal and vertical axes.

FIG. 2 is a schematic graph showing relation of measured values with respect to neutron intensity when being shown on a logarithmic scale both on the horizontal and vertical axes. The horizontal axis represents the neutron intensity. The vertical axis represents the output of the pulse counting unit 3 and the output of the Campbell measurement unit 4. FIG. 2 shows a region of the neutron intensity (referred to as "low-intensity region", hereinafter) where the pulse counting unit 3 has linearity between its input and output. The output of the pulse counting unit 3 is represented by a solid line A, and the output of the Campbell measurement unit 4 by a broken line B.

Therefore, in the pulse counting unit 3, as indicated by solid line A, the output is obtained in such a way as to be proportional to the neutron intensity. Meanwhile, in the Campbell measurement unit 4, because the effects of noise relatively increase with decreases in the neutron intensity, the output does not decrease in proportion to the drop in the neutron intensity, and the output level remains the level corresponding to the height of noise. In general, much of noise is white noise. If there are the effects of inverter load and the like, high frequency noise is superimposed.

Figure 3:
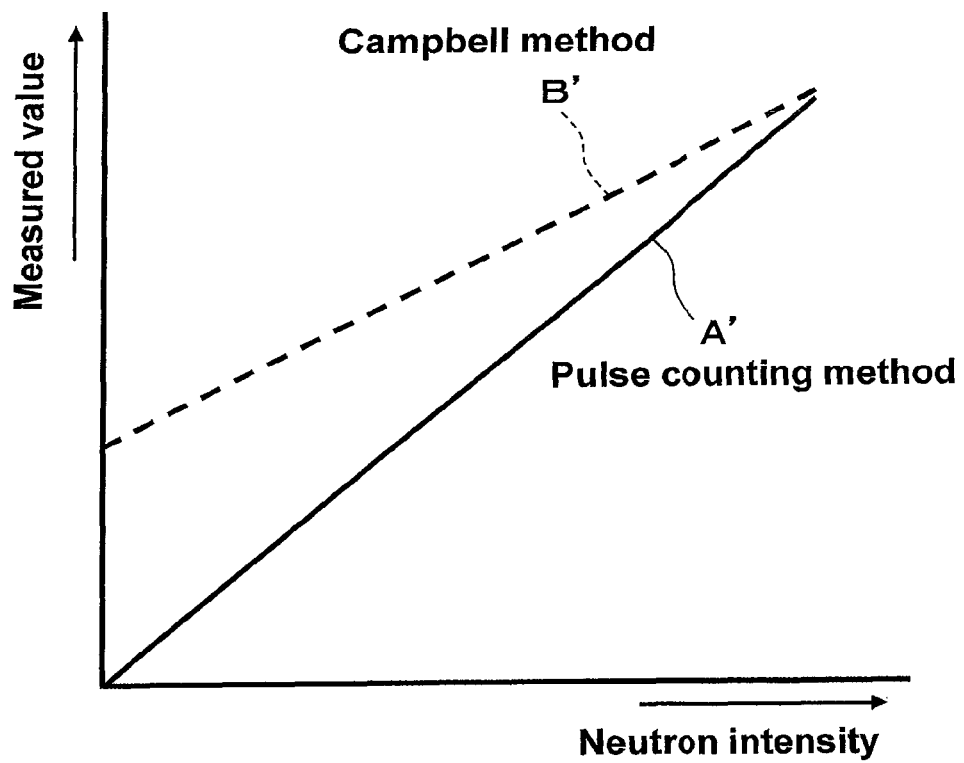
FIG. 3 is a schematic graph showing relation of measured values with respect to neutron intensity when a low-intensity region is shown on a linear scale both on the horizontal and vertical axes.

FIG. 3 is a schematic graph showing relation of measured values with respect to neutron intensity when the low-intensity region is shown on a linear scale both on the horizontal and vertical axes. That is, what is shown on the horizontal and vertical axes is the same as in FIG. 2. But, only the scale on which they are displayed is different from that of FIG. 2. In this case, the output of the pulse counting unit 3 is a straight line passing through the origin, as indicated by a solid line A'. The output of the Campbell measurement unit 4 is a straight line not passing through the origin, as indicated by a broken line B'.

Figure 4:
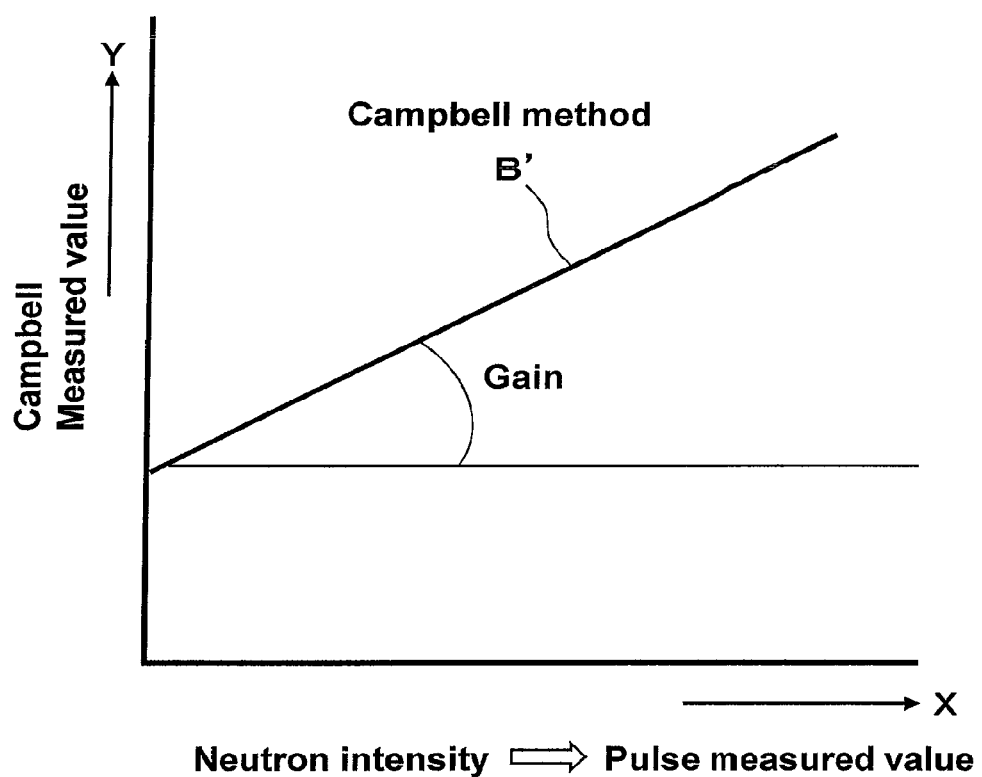
FIG. 4 is a schematic graph showing a pulse measurement value on the horizontal axis and a Campbell measurement value on the vertical axis.

FIG. 4 is a schematic graph showing a pulse measurement value on the horizontal axis and a Campbell measurement value on the vertical axis. Since the output of the Campbell measurement unit 4 is a straight line not passing through the origin as indicated by the solid line B', the output can be expressed by the following formula (1):

$$Y = aX + b \quad (1)$$

where "X" represents the output of the pulse counting unit 3 with respect to the neutron intensity; "Y" represents the output of the Campbell measurement unit 4 at the same moment; "a" represents the rate of change of the output of the Campbell measurement unit 4 with respect to a change in the neutron intensity, or gain of line B'; and "b" represents the output of the Campbell measurement unit 4 when the neutron intensity is zero, or offset of line B'.

As shown in FIG. 4, the values measured by Campbell method are expressed as a straight line and a certain level added (or intercept on the vertical axis). The intercept on the vertical axis is equal to the mean square of fluctuations of background signals, which are not dependent on the neutron intensity.

Reason of the relation described above can be explained as follows. That is, if the neutron detection signal by Campbell measurement method is represented by V, a signal component by neutron of the neutron detection signal V is represented by Vs, and a signal component by background is represented by Vb, the neutron detection signal V is expressed by the following formula (2):

$$V = Vs + Vb \quad (2)$$

Using integral calculation in a sufficiently long time interval T, mean square <V²> of V can be expressed as the sum of mean square <Vs²> of Vs and mean square <Vb²> of Vb, as shown in formula (3), which is introduced by the following formula:

$$\langle V^2 \rangle = \int V^2 dt/T = \int (Vs + Vb)^2 dt/T$$
$$= \left( \int Vs^2 dt + 2\int VsVb dt + \int Vb^2 dt \right) / T$$

Here, because there is no correlation between Vs and Vb, the second term of the right-hand side is therefore zero:

$$\langle V^2 \rangle = \int Vs^2 dt/T + \int Vb^2 dt/T \quad (3)$$
$$= \langle Vs^2 \rangle + \langle Vb^2 \rangle$$

Figure 5:
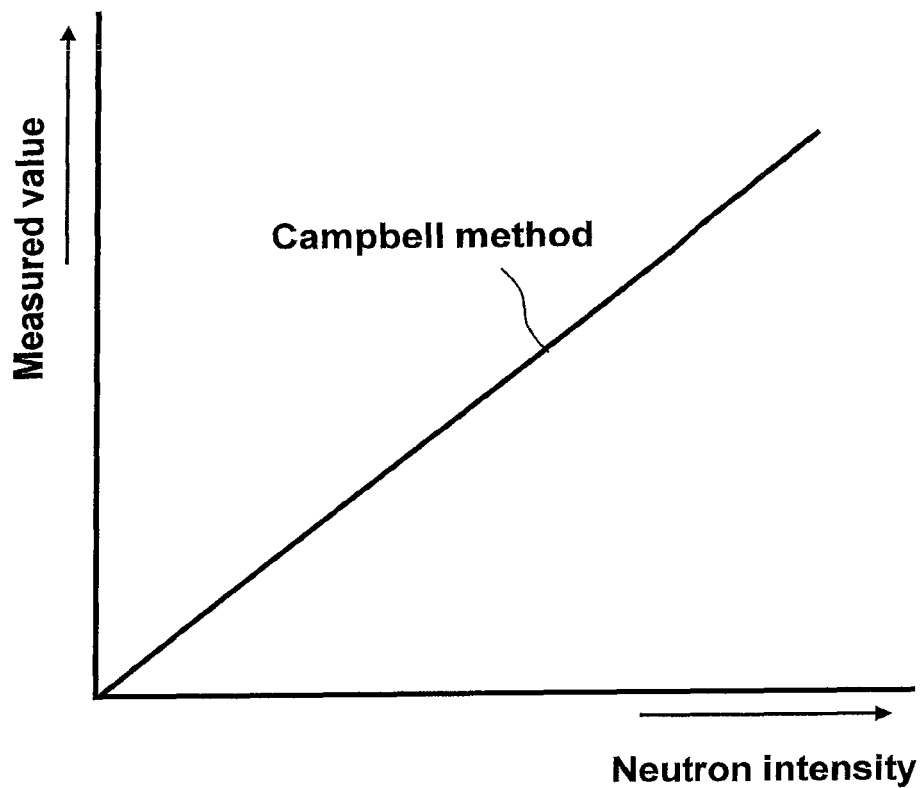
FIG. 5 is a schematic graph showing relation between the output signal of the neutron measurement apparatus and the neutron intensity.

FIG. 5 is a schematic graph showing relation between the output signal of the neutron measurement apparatus and the neutron intensity. The value that should be output by Campbell method is a value removed by offset b, that is aX.

In the low-intensity region, the output of the pulse counting unit 3 is proportional to the neutron intensity. Accordingly, even if X in formula (1) is changed as the output of the pulse counting unit 3 in place of neutron intensity, the relation between X and Y shown in the diagram remains valid. In this case, suppose that an appropriate conversion coefficient to convert the output of the pulse counting unit 3 to neutron intensity has been applied to the output of the pulse counting unit 3. In the low-intensity region, a set of an output of the pulse counting unit 3 and an output of the Campbell measurement unit 4 is collected for different values of neutron intensity. Based on the sets that are obtained as a result of measurement, an autoregression line is obtained. As a result, the gain "a" and offset "b" in formula (1) are calculated.

Once the gain "a" and the offset "b" are obtained, the correction value calculation unit 6 is able to receive, as an input, the output of the Campbell measurement unit 4, to correct the input using the following formula (4), and to output a corrected output value. Accordingly, hereinafter, the gain "a" and the offset "b" are collectively referred to as correction constants.

$$Y' = (Y - b)/a \quad (4)$$

In this case, Y represents the output of the Campbell measurement unit 4, and Y' represents the corrected output value that is output from the correction value calculation unit 6.

Figure 6:
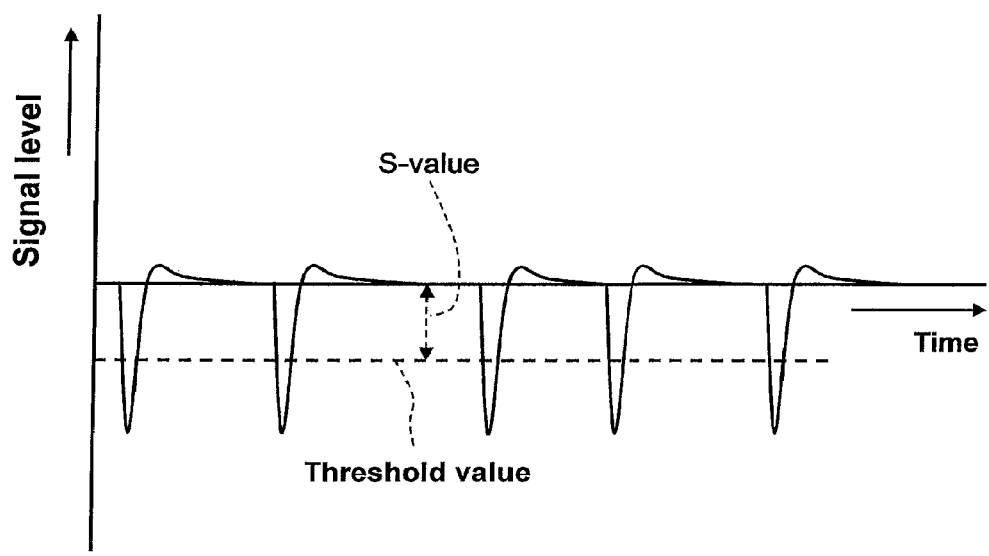
FIG. 6 is a signal response diagram for explaining the pulse counting method.
Figure 7:
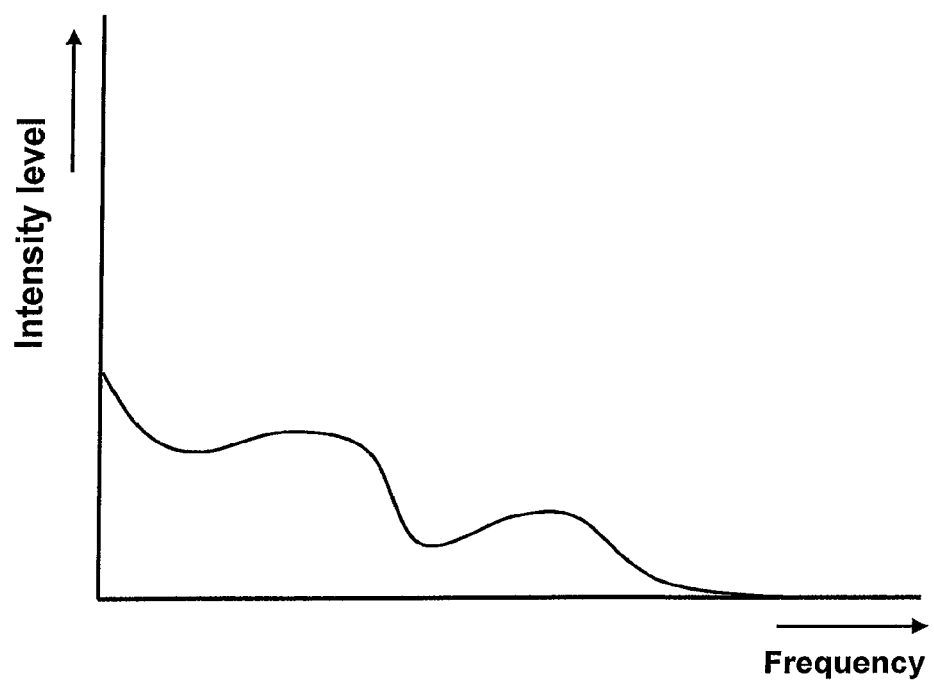
FIG. 7 is a schematic spectrum diagram showing an example of the frequency spectrum of the neutron detection signal.

FIG. 6 is a signal response diagram for explaining the pulse counting method. For example, in the case of FIG. 6, during a time interval being displayed, five pulses are generated. The pulse counting unit 3 counts when the signal falls below a threshold value indicated by broken line, or, when an absolute value of the signal exceeds an S-value which is the width of the threshold value shown in FIG. 6. In the case of FIG. 6, the five pulses are counted without overlapping with each other. FIG. 7 is a schematic spectrum diagram showing an example of the frequency spectrum of the neutron detection signal. The horizontal axis represents frequency, and the vertical axis represents strength at each frequency.

Figure 8:
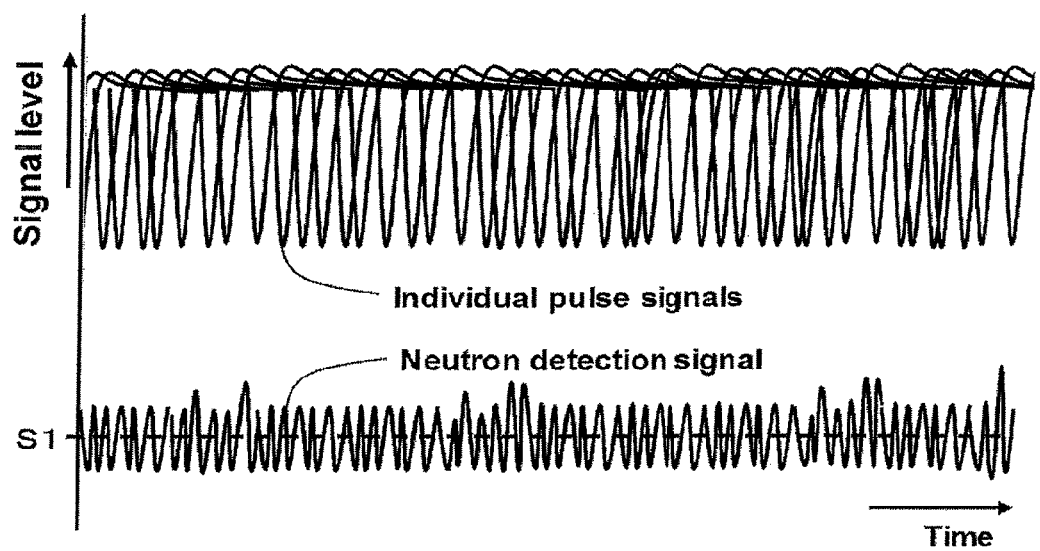
FIG. 8 is a signal response diagram for explaining the Campbell measurement method.

FIG. 8 is a signal response diagram for explaining the Campbell measurement method. As the neutron intensity increases, individual pulse signals approach each other in terms of time. As a result, in some areas, the signals are superimposed on each other. In such a case, the signals are always above the threshold value, and the pulse counting method is unable to measure the neutron intensity. In this case, the neutron detection signal is a signal that can be separated into DC component S1 and, an AC component which increases or decreases relative to the DC component S1, as shown in FIG. 8.

Figure 9:
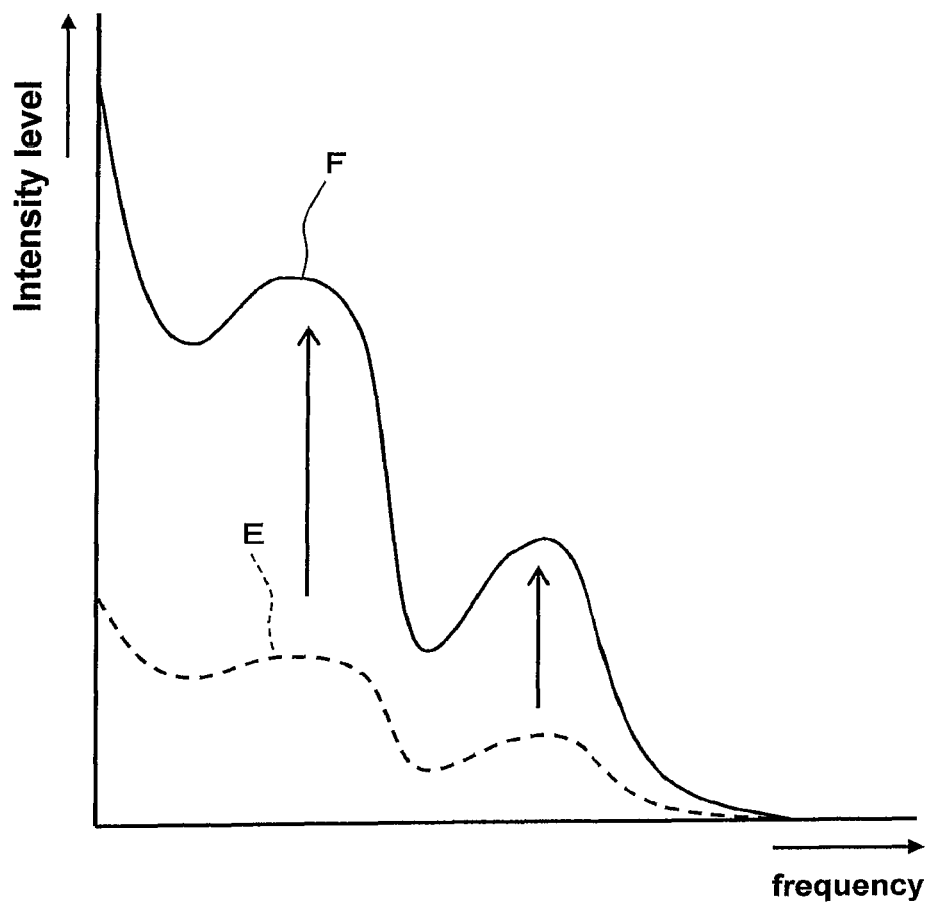
FIG. 9 is a schematic spectrum diagram showing an example of the frequency spectrum of the neutron detection signal in the case of the Campbell measurement method.

FIG. 9 is a schematic spectrum diagram showing an example of the frequency spectrum of the neutron detection signal in the case of the Campbell measurement method. The horizontal axis represents frequency, and the vertical axis represents strength at each frequency. As shown in FIG. 8, the neutron detection signal is a signal on which individual pulse signals are superimposed. Accordingly, frequency spectrum F of the neutron detection signal by Campbell measurement method is one on which frequency spectrums E of individual pulse signals are superimposed. Therefore, as shown in FIG. 9, the frequency spectrum F of the neutron detection signal by Campbell measurement method is one in which the frequency spectrums E of individual pulse signals have been elongated in the vertical-axis direction.

As described above, it can be said that, in the conventional case, the frequency spectrum E of the neutron detection signal measured by pulse counting method has the same form as the frequency spectrum F of the neutron detection signal measured by Campbell measurement method.

By running a simulation in which one pulse output signal of the neutron detector is randomly generated during a certain period of time before being added up, it is easy to confirm that the proportional relation between the neutron intensity and mean-square value $Vs^2$ of the neutron detection signal is satisfied even in the low-intensity region.

Moreover, it is obvious that the mean-square value $Vb^2$ of the signal component associated with the background is not dependent on the neutron intensity. According to the definition of the low-intensity region, it is clear that the results of measurement by pulse counting method are proportional to the neutron intensity in the low-intensity region.

Accordingly, as described above with reference to FIG. 4, in the graph where the horizontal axis represents the pulse measurement value while the vertical axis represents the Campbell measurement value, the intercept on the vertical axis, or the mean square of fluctuations of background signals, is obtained. Then, the intercept is subtracted from the mean square of the neutron detection signal. As a result, the mean square of the signal components associated with the neutrons can be obtained. The proportional relation between the neutron intensity and the mean square of the signal components associated with the neutrons is established even in the low-intensity region.

Therefore, without relying on the pulse counting method, it is possible to measure a wide range of neutron intensity only with the Campbell method. Accordingly, it is possible to make it unnecessary to carry out the signal processing of the Transition region that is used to switch between the pulse counting method and the Campbell method.

Figure 10:
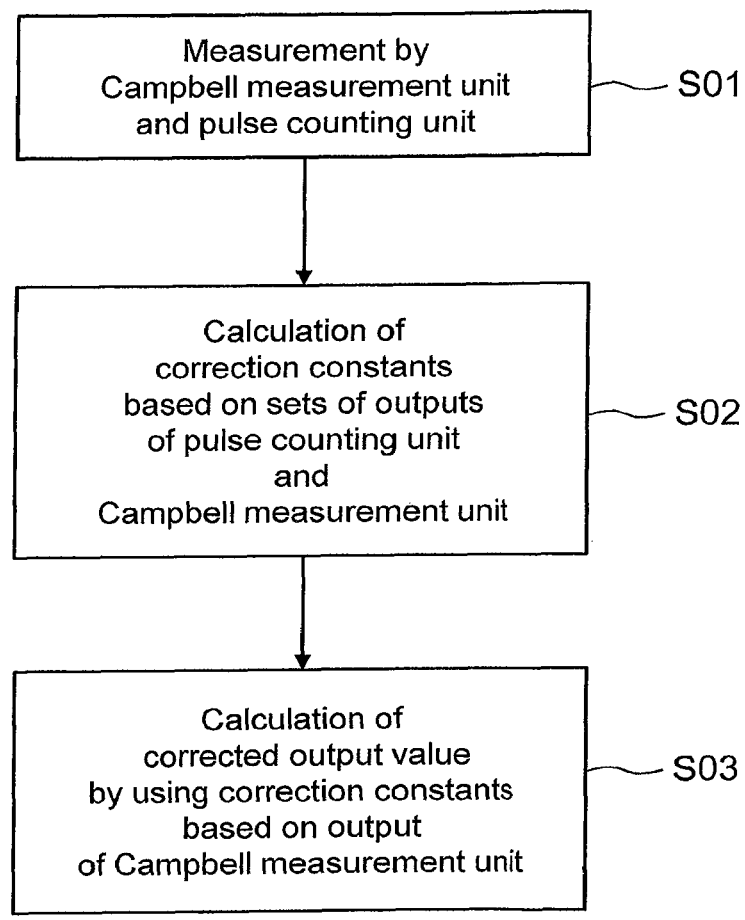
FIG. 10 is a flow chart showing the procedure of a neutron measurement method according to the first embodiment.

FIG. 10 is a block diagram showing the procedure of a neutron measurement method according to the first embodiment.

First, the pulse counting unit 3 and the Campbell measurement unit 4 are used to measure the neutron intensity (Step S01). Then, in the region where the linearity of the input and output of the pulse counting unit 3 is obtained, that is the low-intensity region, based on sets of outputs of the pulse counting unit 3 and Campbell measurement unit 4, the correction constant calculation unit 5 calculates the correction constants, or gain "a" and offset "b" (Step S02).

Then, the correction value calculation unit 6 receives, as an input Y, an output value of the Campbell measurement unit 4, and calculates a corrected output value Y' by using the correction constants and formula (4) (Step S03).

As described above, by using the Campbell method, the Campbell measurement unit 4 can measure neutrons in the low-intensity region, in which the neutrons were measured by the pulse counting unit 3 in the conventional case with the use of the pulse counting method. Accordingly, in the low-intensity region, both the pulse counting unit 3 and the Campbell measurement unit 4 can measure. By comparing the outputs of both, it is possible to confirm whether there is an abnormality, and the confirmation leads to an improvement in the reliability of the measurement.

When a nuclear reactor is started for the first time since initial loading fuel is loaded into the reactor, because a measurement of about 2 to 3 counts per second, for example, is required, the pulse counting unit 3 is used for the measurement, but the Campbell measurement unit 4 cannot be used. Once the reactor power is raised, the neutron intensity in the reactor core amounts to about several hundred counts per second, for example. Accordingly, without using the pulse counting unit 3, it is possible to use only the correction value calculation unit 6 that corrects the output of the Campbell measurement unit 4. In such a case, there is no need to switch from the pulse counting unit 3 to the Campbell measurement unit 4 when the output power is raised, or to switch from the Campbell measurement unit 4 to the pulse counting unit 3 when the output power is lowered.

As described above, according to the present embodiment, the Campbell method can be used to measure the neutrons in the range in which intensity is relatively low and pulse counting method has been used in the conventional case.

[Second Embodiment]

Figure 11:
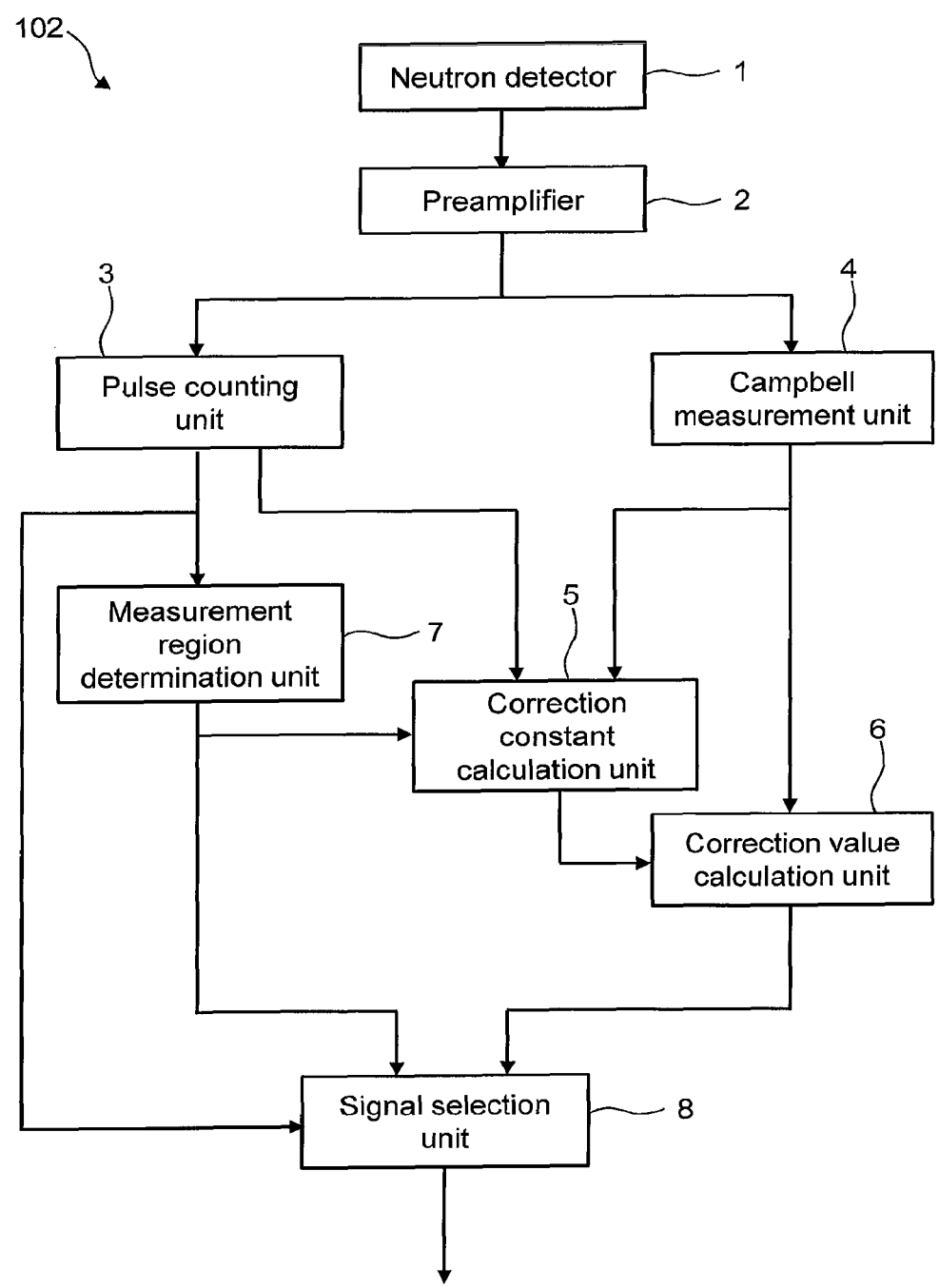
FIG. 11 is a block diagram showing the overall configuration of a neutron measurement apparatus according to a second embodiment.

FIG. 11 is a block diagram showing the overall configuration of a neutron measurement apparatus according to a second embodiment. The present embodiment is a variant of the first embodiment. A neutron measurement apparatus 102 of the second embodiment further includes a measurement region determination unit 7 and a signal selection unit 8.

The measurement region determination unit 7 has set in advance upper limit value Xmax at which the linearity of pulse counted value Xi of the pulse counting unit 3 can be maintained with respect to neutron intensity Φn at a position where the neutron detector 1 is placed. Instead of the upper limit value, the value which has been calculated by subtracting a margin from the upper limit value may be used as Xmax. If the pulse counted value Xi is less than or equal to Xmax, the measurement region determination unit 7 outputs a regression calculation permission signal as ON. When the regression calculation permission signal is being output from the measurement region determination unit 7, the correction constant calculation unit 5 calculates a linear regression line of the pulse counted value Xi which is counted by the pulse counting unit 3, and calculates the result Yi of measurement by the Campbell measurement unit 4, and outputs the gain "a", offset "b", and residual error.

$$Y=aX+b$$

If the residual error calculated by the correction constant calculation unit 5 is less than or equal to a preset value, the correction value calculation unit 6 performs correction calculation on the result Yi of measurement by the Campbell measurement unit 4 by using the gain "a" and offset "b", which are calculated by the correction constant calculation unit 5:

$$Y'i=(Yi-b)/a$$

Then, the correction value calculation unit 6 outputs corrected value Y'i, and also outputs a correction calculation completion signal as ON.

The initial value of the correction calculation completion signal is OFF. After the operation by the correction value calculation unit 6 of calculating the corrected value has been completed even once, the correction calculation completion signal is kept ON. When the correction calculation completion signal is OFF, the correction value calculation unit 6 outputs the result Yi of measurement by the Campbell measurement unit 4 as the corrected value Y'i.

The signal selection unit 8 receives, as inputs: the corrected value Y'i, which is a signal from the correction value calculation unit 6; the pulse counted value Xi, which comes from the pulse counting unit 3; the regression calculation permission signal, which comes from the measurement region determination unit 7; and the correction calculation completion signal, which comes from the correction value calculation unit 6. Only when the regression calculation permission signal is ON and the correction calculation completion signal is OFF, the signal selection unit 8 selects and outputs the pulse counted value Xi. Otherwise, that is, when the correction calculation completion signal is ON or the regression calculation permission signal is OFF, the signal selection unit 8 selects and outputs the corrected value Y'i.

According to the present embodiment, after the neutron measurement apparatus 102 is activated, the pulse counted value Xi is output in the Pulse region where the neutron intensity is low; in the Campbell region where the neutron intensity is high, the result Yi of measurement by Campbell method is output, until the first correction calculation is carried out. However, in a typical nuclear reactor, the neutron intensity gradually increases. Therefore, before the neutron intensity goes beyond the Pulse region and reaches the Campbell region, the correction calculation is carried out and the output signal is switched to the corrected value Y'i.

The corrected value Y'i, which is corrected by the gain and offset obtained from the linear regression line, is equivalent to the pulse counted value Xi in the Pulse region where the linearity of the pulse counting method is maintained. Therefore, the switch from the pulse counted value Xi to the corrected value Y'i is smoothly conducted. As a result, the problem with discontinuity of signals in the Transition region, which was a problem in the conventional case at the time of switching between the pulse counting method and the Campbell method, does not arise.

[Third Embodiment]

Figure 12:
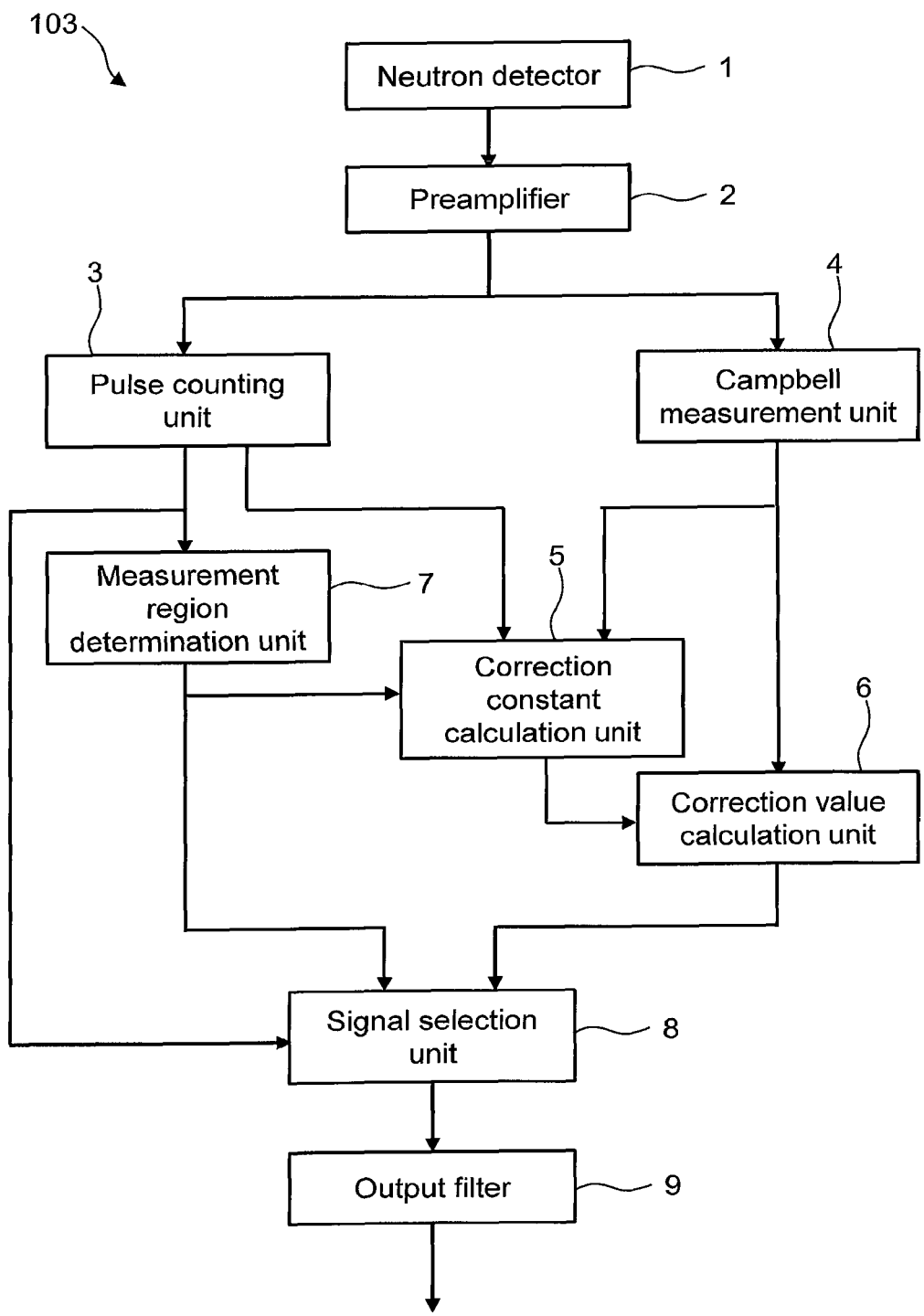
FIG. 12 is a block diagram showing the overall configuration of a neutron measurement apparatus according to a third embodiment.

FIG. 12 is a block diagram showing the overall configuration of a neutron measurement apparatus according to a third embodiment. The present embodiment is a variant of the second embodiment. A neutron measurement apparatus 103 of the third embodiment further includes an output filter 9. The output filter 9 is provided after the signal selection unit 8. The output filter 9 is a low-pass filter with an appropriate time constant.

In the case of the second embodiment, a difference in the level of the output signals at a time when the measurement method is switched from the pulse counting method to the Campbell method can be kept within the level almost equal to the residual error of the linear regression line. According to the third embodiment, the output filter 9 is provided. Therefore, in the neutron measurement apparatus 103, a difference in level between the output signal of the pulse counting unit 3 and the output signal of the correction value calculation unit 6 at a time when the measurement method is switched from the pulse counting method to the Campbell method can be more gently.

[Fourth Embodiment]

Figure 13:
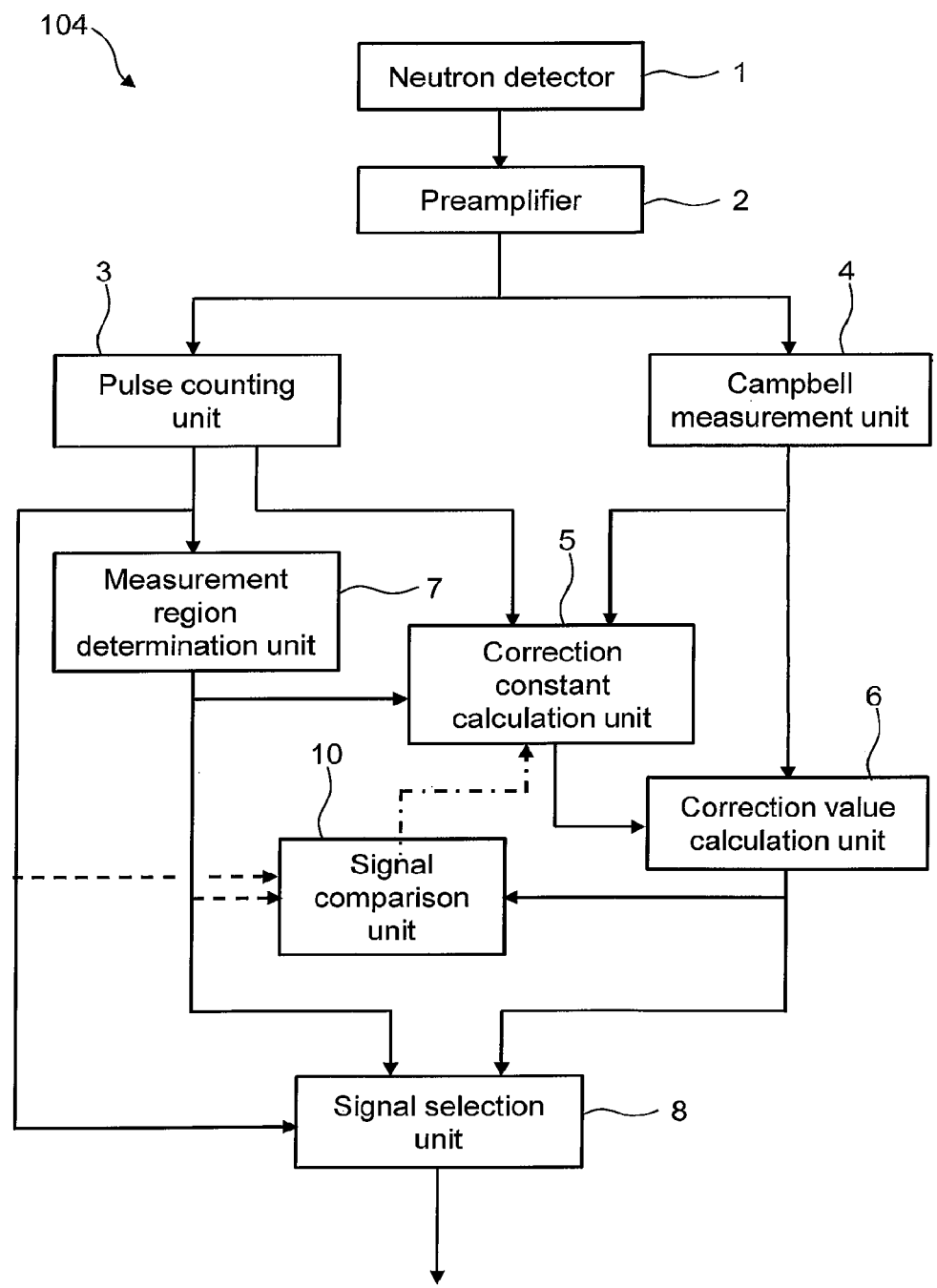
FIG. 13 is a block diagram showing the overall configuration of a neutron measurement apparatus according to a fourth embodiment.

FIG. 13 is a block diagram showing the overall configuration of a neutron measurement apparatus according to a fourth embodiment. The present embodiment is a variant of the second embodiment. A neutron measurement apparatus 104 of the fourth embodiment further includes a signal comparison unit 10.

In the low-intensity region where the measurement region determination unit 7 has determined that the pulse counted value Xi is smaller than the upper limit value Xmax at which the input-and-output linearity can be maintained in the pulse counting unit 3, the signal comparison unit 10 compares the corrected value Y'i, which is an output signal of the correction value calculation unit 6, with the pulse counted value Xi, which is an output signal of the pulse counting unit 3. If the difference between the corrected value Y'i and the pulse counted value Xi exceeds a preset specified value, the signal comparison unit 10 requests the correction constant calculation unit 5 to carry out again the operation of calculating the correction constants. The specified value is set, for example, about three times as large as the residual error that is obtained when the calculation is conducted by the correction constant calculation unit 5.

The correction constant calculation unit 5 performs the operation of calculating the correction constants only when the neutron measurement apparatus 104 is initialized or when a request is made by the signal comparison unit 10 to carry out again the correction constant calculation. As a result, the output signal becomes stable because the correction constants, which the correction value calculation unit 6 uses during the correction calculation, do not change frequently.

[Fifth Embodiment]

Figure 14:
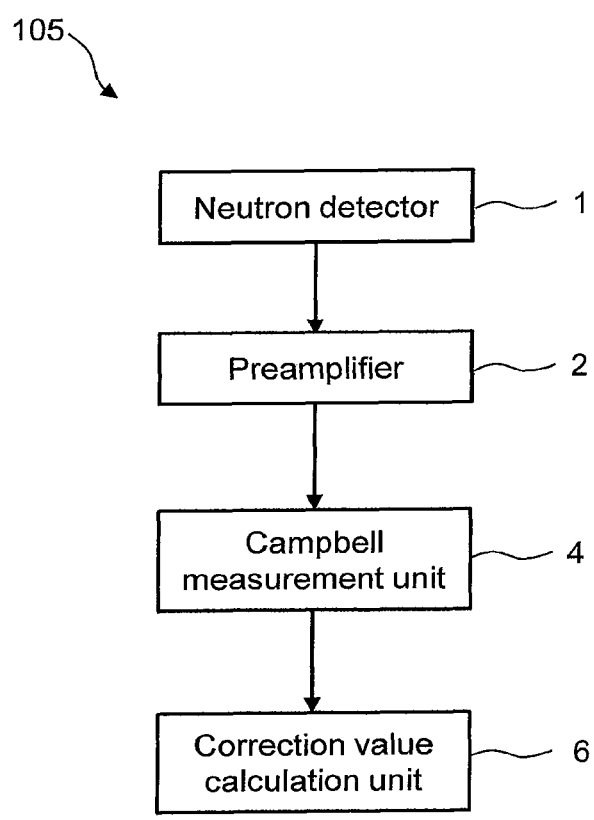
FIG. 14 is a block diagram showing the overall configuration of a neutron measurement apparatus according to a fifth embodiment.
Figure 15:
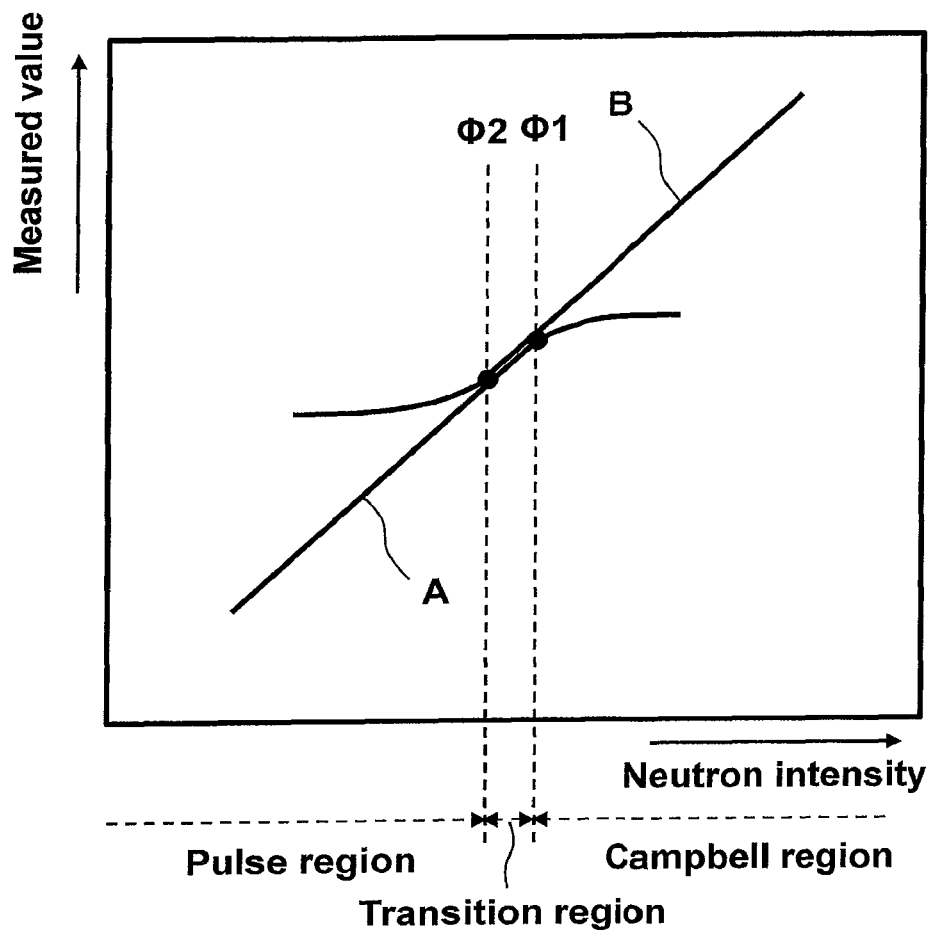
FIG. 15 is a schematic graph that is obtained by using the pulse counting method and Campbell method to measure an output signal of a neutron detector, showing relation of measured values with respect to neutron intensity when there is a Transition region.
Figure 16:
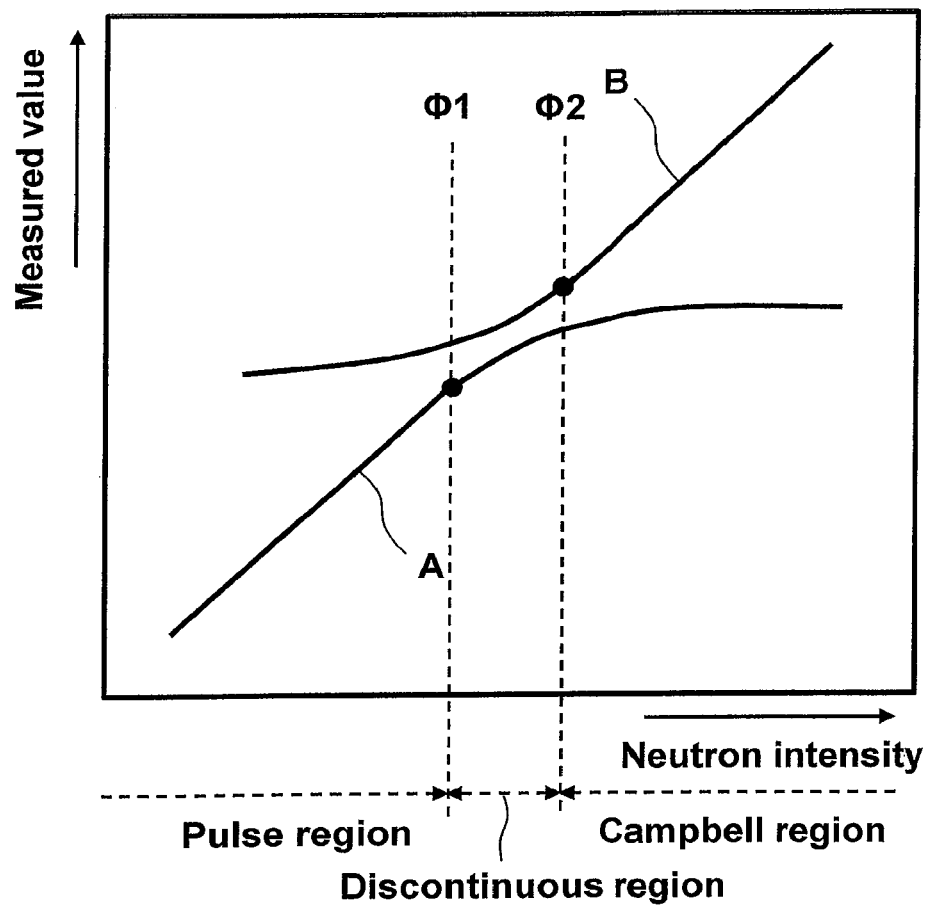
FIG. 16 is a schematic graph that is obtained by using the pulse counting method and Campbell method to measure an output signal of a neutron detector, showing relation of measured values with respect to neutron intensity when there is a discontinuous region.

FIG. 14 is a block diagram showing the overall configuration of a neutron measurement apparatus according to a fifth embodiment.

According to the fifth embodiment, the operation of calculating the correction constants is separately carried out offline. The results thereof are stored in the correction value calculation unit 6. As a result, the measurement region by Campbell method of a neutron measurement apparatus 105 with a simple configuration can be expanded to cover a region where the neutron intensity is low.

[Other Embodiments]

While certain embodiments have been described, these embodiments have been presented by way of example only, and are not intended to limit the scope of the inventions. Indeed, the novel methods and systems described herein may be embodied in a variety of other forms.

Any of the characteristic features of two or more than two of the above described embodiments may be combined for use.

Furthermore, the above described embodiments may be modified in various different ways. For example, any of the components of the embodiments may be omitted, replaced or altered without departing from the spirit and scope of the invention.

All those embodiments and their modifications are within the spirit and scope of the present invention specifically defined in the appended claims and their equivalents.

What is claimed is:

1. A neutron measurement apparatus to measure neutron intensity in a region where a nuclear reactor power is lower than a predetermined Power Range, the apparatus comprising:
   a neutron detector to generate an output signal corresponding to an incoming neutron;
   a preamplifier to amplify an output signal of the neutron detector to output the amplified output signal of the neutron detector as a neutron detection signal;
   a pulse counter to measure neutron intensity by using a pulse counting method by which the neutron detection signal is used to count a number of individual pulses;
   a Campbell meter to measure the neutron intensity by using a Campbell method by which a time average of squares of an AC component of the neutron detection signals is calculated;
   a correction constant calculator to calculate a correction constant for correcting an output of the Campbell meter by using an output of the pulse counter and an output of the Campbell meter; and
   a correction value calculator that outputs, based on the output of the Campbell meter, a corrected value by using the correction constant, wherein
   the correction constants are a gain "a" and an offset "b" that are calculated by regression calculation expressed by the following formula (1), in a region where linearity of input and output can be obtained in the pulse counter, and the corrected value "Y'" is calculated by the following formula (2):

$$Y = aX + b \quad (1)$$

$$Y' = (Y - b)/a \quad (2)$$

where X represents the output of the pulse counter and Y represents the output of the Campbell meter at a same moment.

2. The neutron measurement apparatus according to claim 1, further comprising:

a measurement region determinator that determines whether or not a level of the neutron intensity is in a lower level region that is lower than an upper-limit neutron intensity level $\Phi 1$ of a region where linearity of the input and output is obtained in the pulse counter; and a signal selector that switches, when it is determined by the measurement region determinator that the level is in the lower level region, from the output of the Campbell meter to the output of the correction value calculator.

3. The neutron measurement apparatus according to claim 2, further comprising an output filter that receives, as an input, an output from the signal selector and has a predetermined time constant.

4. A neutron measurement method for measuring neutron intensity in a region where a nuclear reactor power is lower than a predetermined Power Range, the method comprising:

measuring the neutron intensity by using pulse counting method;

calculating a correction constant based on relation between an output of a pulse counter and an output of a Campbell meter, in a region where linearity of input and output is maintained in the pulse counting method; and receiving by a correction value calculator, as an input, an output value of the Campbell meter after calculation of the correction constant, and calculating a corrected output value of the Campbell meter by using a correction formula that uses the correction constant.

* * * * *